United States Patent [19]
Nagorcka

[11] Patent Number: 5,409,305
[45] Date of Patent: Apr. 25, 1995

[54] UNDERCARRIAGE FOR A TRACK LAYING VEHICLE

[75] Inventor: James A. Nagorcka, Vic, Australia

[73] Assignee: Deere & Company, Moline, Ill.

[21] Appl. No.: 107,396

[22] Filed: Aug. 16, 1993

[30] Foreign Application Priority Data

Aug. 17, 1992 [AU] Australia ............... PL4156

[51] Int. Cl.6 .................................. B62D 55/084
[52] U.S. Cl. ........................ 305/21; 305/32; 180/9.52
[58] Field of Search .............. 305/10, 21, 22, 24, 305/27, 28, 29, 30, 31, 32; 180/9.1, 9.52, 9.64

[56] References Cited

U.S. PATENT DOCUMENTS

| | | | |
|---|---|---|---|
| 2,506,360 | 5/1950 | Henning | 305/31 |
| 2,719,062 | 9/1955 | Arps | 305/31 X |
| 3,241,889 | 3/1966 | Borison et al. | 305/32 |
| 3,275,386 | 9/1966 | Bexten | 305/22 X |
| 3,807,521 | 4/1974 | Sargent | |
| 4,018,295 | 4/1977 | Hasselbacher | 305/31 X |
| 4,339,156 | 7/1982 | Livesay | |
| 4,361,363 | 11/1982 | Livesay | |
| 4,362,340 | 12/1982 | van der Lely | 305/31 |
| 4,373,758 | 2/1983 | Livesay | |
| 4,405,026 | 9/1983 | Merrifield | |
| 4,413,862 | 11/1983 | Ragon | 305/32 X |
| 4,519,654 | 5/1985 | Satzler et al. | |
| 4,840,437 | 6/1989 | Henry et al. | 305/31 X |
| 5,127,714 | 7/1992 | Satzler | |
| 5,191,951 | 3/1993 | Bargfrede et al. | 305/29 X |

FOREIGN PATENT DOCUMENTS

| | | | |
|---|---|---|---|
| 1401309 | 4/1964 | France | |
| 2416825 | 2/1978 | France | |
| 660856 | 5/1938 | Germany | 305/27 |
| 1583320 | 8/1990 | U.S.S.R. | 305/32 |
| 1745605 | 7/1992 | U.S.S.R. | 305/31 |
| WO8703551 | 6/1987 | WIPO | |
| WO9107306 | 5/1991 | WIPO | |
| WO90/05996 | 4/1993 | WIPO | |

Primary Examiner—Russell D. Stormer

[57] ABSTRACT

An adjustment device for a track assembly of a track laying vehicle, comprising a wheel carriage for mounting a wheel of the track assembly thereto, a coupling assembly operatively connected to or forming part of the wheel carriage for permitting at least limited rotational movement of the wheel about a tilt axis, and a releasable locking assembly for releasably holding the wheel against the rotational movement, in a selected angular disposition relative to the tilt axis. There is also provided a suspension assembly for a track laying vehicle, comprising a support member operatively connected to the vehicle body for pivotal movement about a transversely extending first pivot axis and a coupling member operatively interconnecting one of the wheels of the vehicle and the support member the coupling member being pivotally mounted for pivotal movement about a second pivot axis.

9 Claims, 4 Drawing Sheets

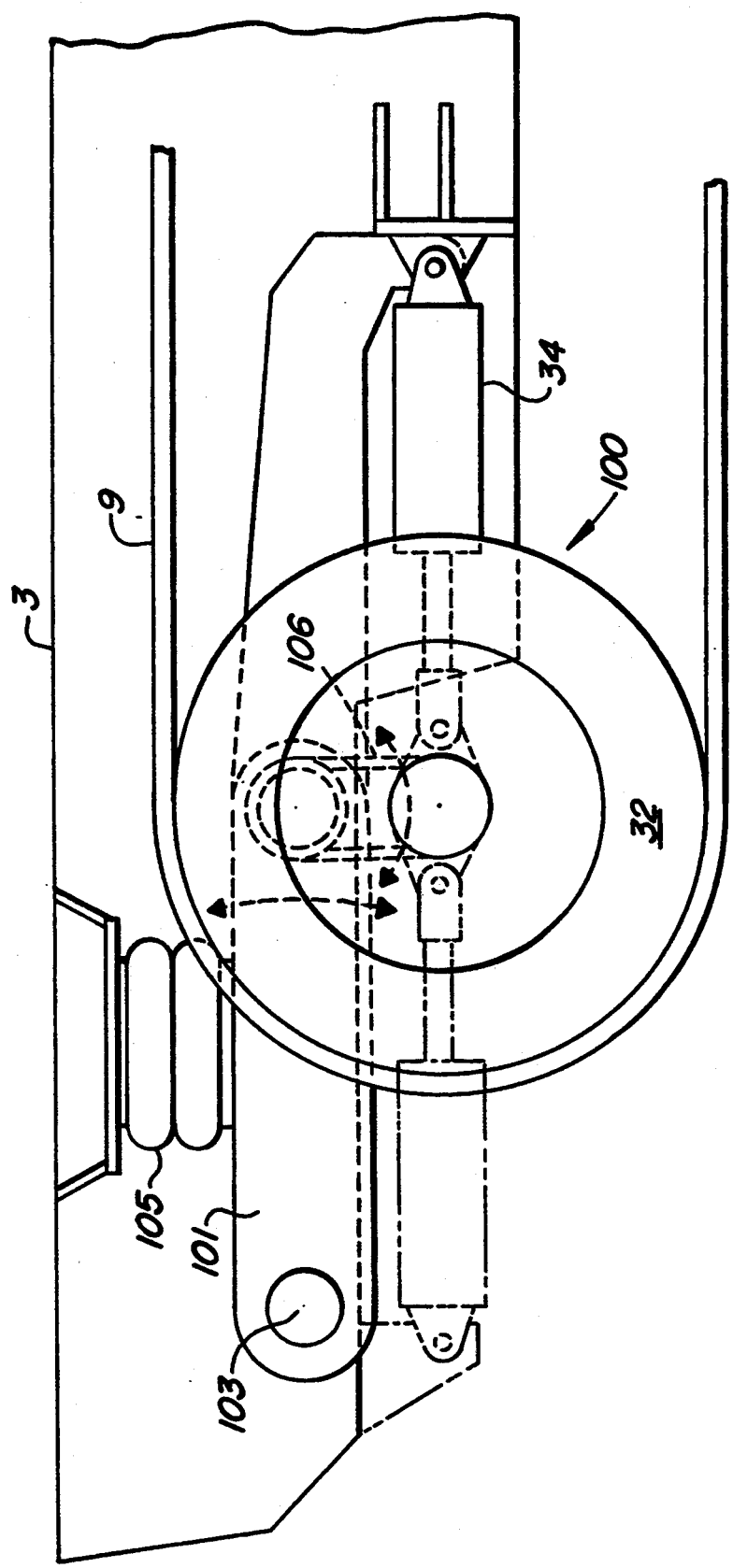

UNDERCARRIAGE FOR A TRACK LAYING VEHICLE

BACKGROUND OF THE INVENTION

1. Field of the Invention

This invention relates generally to a track laying vehicle and to apparatus and devices suitable for use in such a vehicle.

2. Description of the Prior Art

The track laying vehicle may be of the type comprising a vehicle body having a longitudinal axis extending between forward and rearward ends thereof and a pair of track assemblies each disposed on respective opposite sides of the vehicle body. Each assembly may comprise first and second wheels which are spaced apart in the direction of the longitudinal axis with at least one of the wheels defining a drive wheel, and each having a continuous belt associated with the wheels thereof. An example of one form of vehicle of this type is described in applicant's international application PCT/AU90/00542.

One problem associated with tracked vehicles of this type is that the belt can be become misaligned and not track in the desired fashion over the wheels with which it is associated. This misalignment can be as a result of design defects in the belt itself or in other parts of the track assembly. Such misalignment can also occur as a result of incorrect installation.

SUMMARY

It is an object of the invention according to a further one aspect of the present invention to provide an adjustment device which assists in correcting the aforementioned track misalignment.

Track vehicles of this type also require a suspension system which enables the vehicle to be able to operate under a wide variety of operating conditions whilst maintaining a tension on the belts sufficient to transmit power from the drive wheels to the ground over which the vehicle travels. Generally, such suspension systems have in the past been relatively complicated and as such relatively costly and difficult to maintain.

It is an object of the invention according to a further aspect of the present invention to provide an improved suspension system which permits a relatively high degree of flexibility whilst being relatively simple in construction.

According to one aspect of the present invention there is provided an adjustment device for a track assembly of a track laying vehicle of the type referred to above, the device comprising wheel carriage means for mounting a wheel of the track assembly thereto, coupling means operatively connected to or forming part of the wheel carriage means for permitting at least limited rotational movement of the wheel about a tilt axis, and releasable locking means for releasably holding the wheel against the rotational movement, in a selected angular disposition relative to the tilt axis.

Preferably the tilt axis is generally parallel with the longitudinal axis of the vehicle.

The wheel carriage means may comprise a support arm for receiving the wheel. With reference to the vehicle of the type described earlier the wheel is preferably the idler wheel and may include a wheel axle having an axis about which the wheel rotates. Preferably the wheel axle is mounted at one end of the support arm and the coupling means at or towards the other end.

The support arm may be generally a box shaped section although it will be appreciated it could take a variety of forms.

The coupling means may comprise two co-operating coupling elements one operatively connected to the wheel carriage and the other operatively connected to the vehicle body. In one form, the coupling means includes a mounting arm secured to the vehicle body, the mounting arm having secured thereto one of the co-operating coupling elements.

The coupling elements may be in the form of end plates or flanges one being on the end of the support arm and the other on the end of the mounting arm. The end plates are arranged for relation relative to one another about an axis which defines the tilt axis. A guide pin may be provided which extends between the plates and about which the plates can pivot relative to one another.

The releasable locking means may be in the form of releasable fastener which may comprise bolt members and locking nuts associated therewith. Preferably, the bolts are arranged to project from one of the plates and extend through arcuate slots in the other of the plates so as to permit limited rotation therebetween. The fastening lock nuts can be tightened to hold the plates in a selected disposition relative to one another.

It will be appreciated that by rotating one of the end plates relative to the other the wheel can be rotated or pivoted about the pivot axis so as to adopt a desired angular position relative to the vehicle body.

The wheel carriage means and coupling means may form part of the wheel suspension system and may, for example, form part of the suspension system according to the other aspect of the invention as hereinafter described. It will be appreciated however that the suspension system according to this other aspect need not include the adjustment device as hereinbefore described.

According to another aspect of the present invention there is provided a suspension assembly for a track laying vehicle, the assembly comprising a support member operatively connected to the vehicle body for pivotal movement about a transversely extending first pivot axis and a coupling member operatively interconnecting one of the wheels of the vehicle and the support member the coupling member being pivotally mounted for pivotal movement about a second pivot axis.

The arrangement is such that the pivotal movement of the support member about the first pivot axis permits up and down movement of the wheel relative to the vehicle body and the pivotal movement of the coupling member about the second pivot axis permits forward and rearward movement of the wheel relative to the vehicle body.

The suspension assembly may further include means for tensioning the belt when in the operative position on the track assembly. Advantageously the tensioning means is arranged to so as to act on the coupling member.

In one form the support member may comprises an arm operatively connected to the vehicle body for pivotal movement about the first pivot axis. Preferably, the support arm is pivotally connected to the vehicle body in the region of one end portion thereof and the coupling member is operatively connected to the support member at a point spaced from the aforementioned one end portion and preferably at the other end portion thereof.

There may further be provided spring means between the support member and the vehicle body, the spring means being spaced in relation to the first pivot axis. The spring means may be in the form of an air spring preferably disposed between the vehicle body and the end of the support arm remote from the first pivot axis.

The coupling member may be in the form of a connecting link having one end portion pivotally connected to the support member and the other end portion operatively connected to the vehicle wheel.

The tensioning means may be in the form of a piston/cylinder assembly operatively interconnecting the wheel with the vehicle body. The tensioning means may be arranged to either push or pull the belt into its tensioned condition.

If desired an adjustment device of the type described according to the first aspect of the invention can be incorporated into the suspension assembly. For example, the adjustment coupling means may be in the support member of the suspension so that the support member comprises two parts rotatable relative to one another.

BRIEF DESCRIPTION OF THE DRAWINGS

The advantages of the various aspects of the invention will become apparent from the following description of preferred embodiments when read in conjunction with the drawings as follows:

FIG. 7 is a schematic side elevation of a suspension assembly according to the present invention.

DETAILED DESCRIPTION

Figure 1:
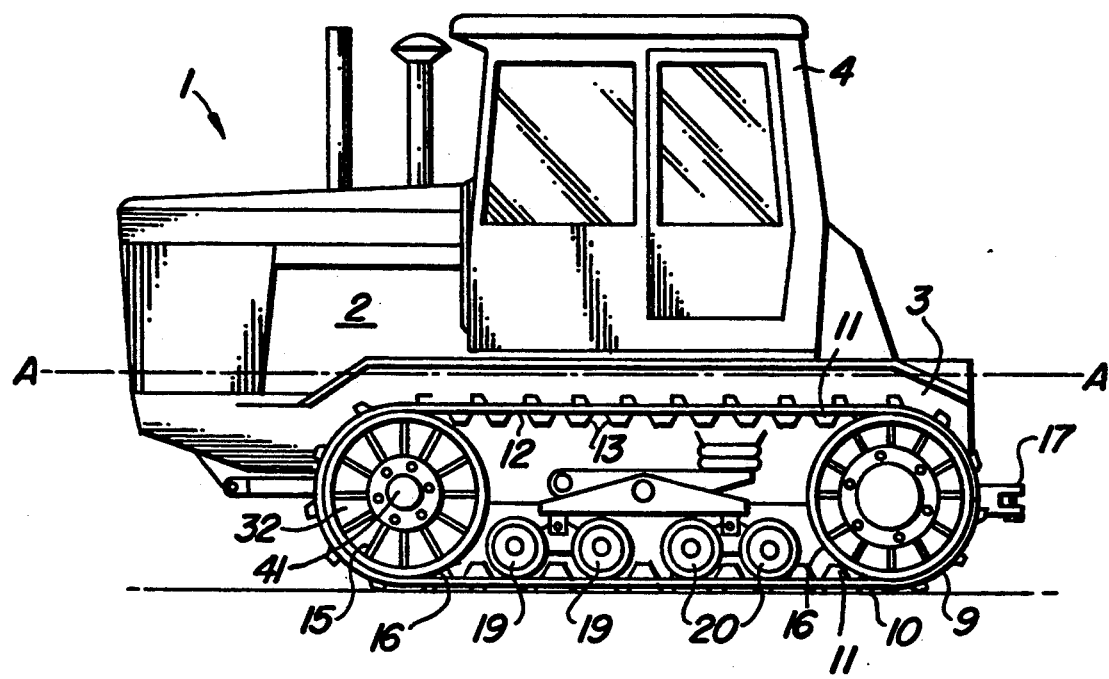
FIG. 1 is a side elevation view of the work vehicle.

FIG. 1 illustrates a typical heavy duty elastomeric track laying vehicle 1 having a chassis and frame 3 with a longitudinal axis A—A, an operators cabin 4 and an engine 2. Connected to frame 3 is a drawbar 17 which is used to attach draft loads. Although the vehicle illustrated would be used in the main for heavy-duty draft work, the principles inherent in this invention would also apply to a vehicle for pushing, hauling and carrying large loads. The vehicle is propelled by an elastomeric track 9 along each longitudinal side of chassis 3 which is entrained around a drive wheel 5, and idler wheel 32 and load sharing track wheels 19, 20. Ground engagement of the track 9 is through lugs 10 which form part of track 9. Each track is supported by laterally spaced surfaces 16 of the wheel 5 and idler wheel 32.

Each track 9 has direct drive engagement with the drive wheel 5 by means of an interlock between the cross members 7 of the drive wheel 5 and the drive lugs 11 which are part of the track 9. The interlock between cross members 7 and drive lugs 11 is maintained by the hydraulic cylinder 34 tensioning the idler wheel 32 away from the drive wheel 5.

The drive system can be likened to a roller chain and sprocket drive but the roller forms part of the sprocket while the teeth from part of the chain. Such an arrangement of vehicle of this type is described in applicant's international application PCT/AU90/00542.

The idler wheels 32 which rotate around axis 41 are of similar construction to that of the drive wheel 5, but without the cross members. Each idler wheel consists essentially of a knave attached to an axle, the knave being attached to lateral plates or spokes placed radically around the axis of rotation of the idle axles. The spokes 15 are attached to laterally spaced rims 16 to which may be bonded an elastomeric cushion which has a surface to the support surface of the track. The spokes have been cut away to make an open area which allows random entry of the drive lugs 11 to any point around the circumference of idler wheel 32.

The drive lugs of the track are guided into lateral registry with the idler wheel in the same way as the drive wheel but without the assistance of the cross members.

The track 9 and drive lugs 11 maintain lateral registry with the load sharing wheels 19 and 20 because these wheels form a channel in a longitudinal line between the drive wheel 5 and idler wheel 32. As with the drive wheel 5 and idler wheel 32, lateral movement of the track 9 is restricted to lateral movement of the drive lugs 11 within the angled guiding surfaces of each pair of load sharing wheels 19 and 20. The track is in the same form as an elastomeric track 9 having no joint(s) and is therefore continuous and has an endless characteristic.

Figure 2:
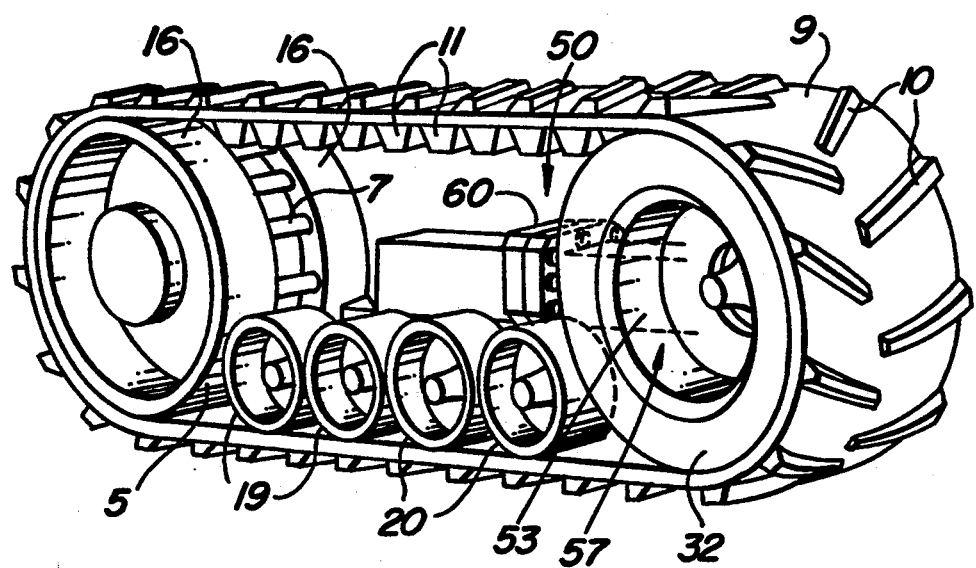
FIG. 2 is a schematic perspective view of a track assembly having an adjustment device according to the invention.
Figure 3:
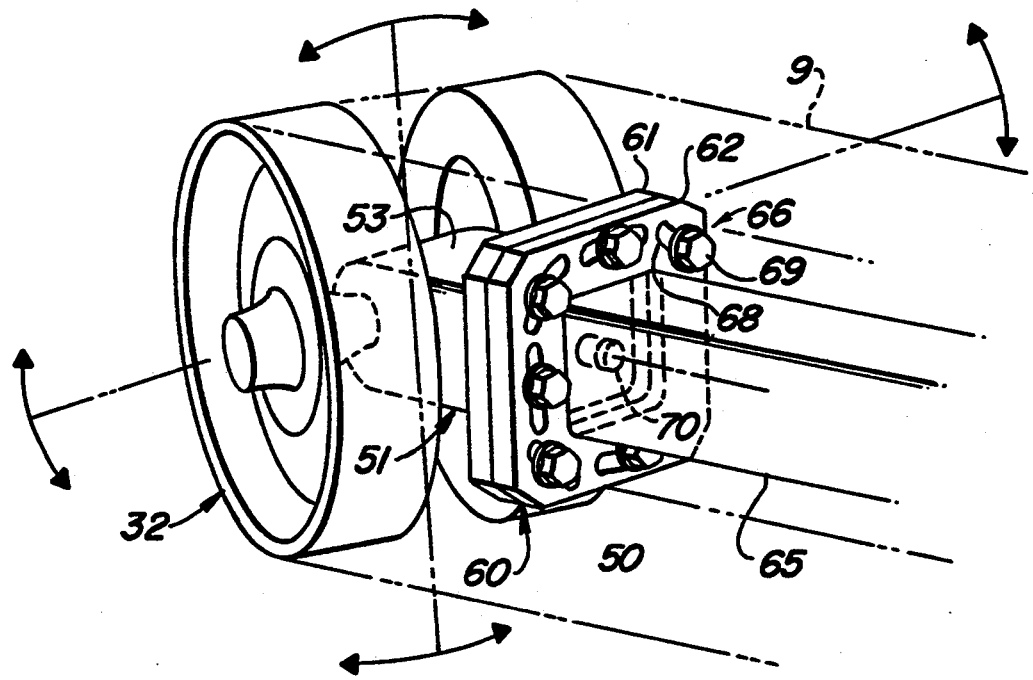
FIG. 3 is a more detailed view of the adjustment device shown in FIG. 2.

The adjustment device 50 of the invention is best understood with reference to FIGS. 2 to 6. The adjustment device 50 as shown in FIGS. 2 and 3 includes a wheel carriage 51 to which is mounted the idler wheel 32. As shown the wheel carriage 51 comprises a support arm 53 which receives the wheel axle of the idler wheel 32 at one end thereof.

The device further includes coupling means 60 which comprises a pair of plate members or flanges 61 and 62, one 61 being secured to or forming part of the support arm 53 and the other being secured to or forming part of a mounting arm 65 which in turn is operatively connected to the vehicle body.

The coupling means further includes a plurality of releasable fasteners 66 in the form of bolts secured to one of the flanges 61, the bolts extruding through slots 68 in the other of the flanges 62. Each bolt has a lock nut 69 associated therewith such that when tightened the two flanges are inhibited from movement relative to one another. The slots 68 permit limited rotational movement between the two parts thereby permitting tilting of the idler wheel.

A guide pin 70 extends between support arm 53 and mounting arm 65, the two arms being rotatable about the pin axis. The pin also serves to locate the arms correctly with respect to one another.

Figure 5A:
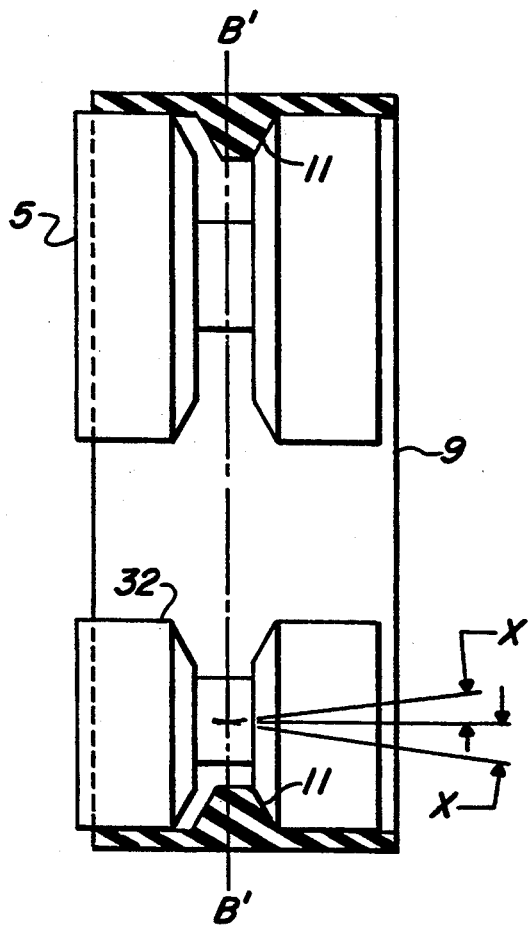
FIGS. 5(a) and 5(b) are a plan view and end elevation respectively of a prior adjustment device.
Figure 5B:
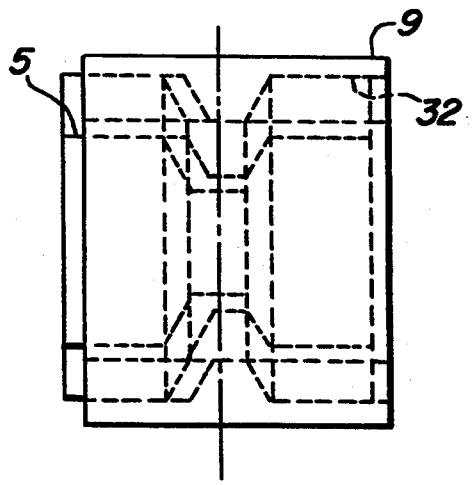

FIG. 5 illustrates a prior art adjustment arrangement. In the plan view it can be seen how the idler wheel 32 is arranged to pivot about an axis B'—B', which enables the wheel to "toe in" or "toe out" depending upon what is required. The movement is illustrated by X in the drawing.

Figure 6A:
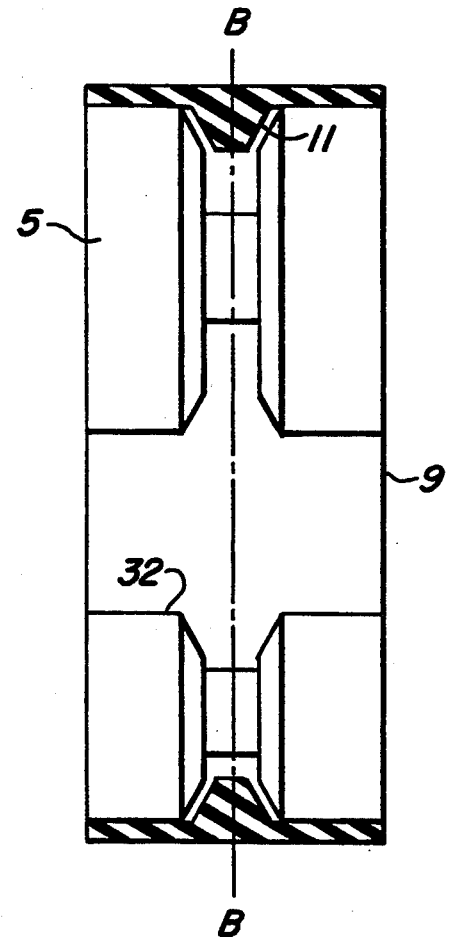
FIGS. 6(a) and 6(b) are a plan view and end elevation respectively of an adjustment device according to the invention.
Figure 6B:
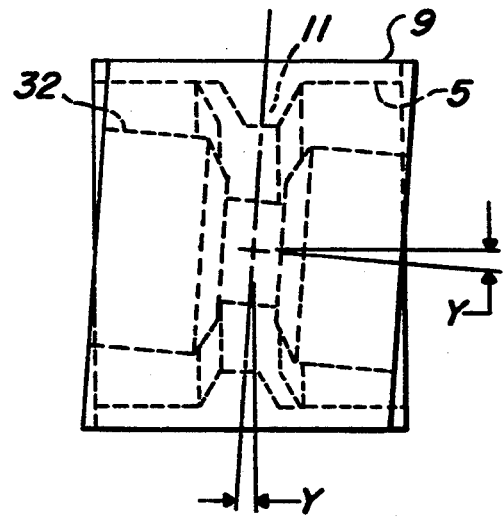

FIG. 6 on the other hand shows the effect of the adjustment device according to the present invention where the idler wheel 32 tilts about the tilt axis B—B. The movement is illustrated by Y in the drawing.

Figure 4:
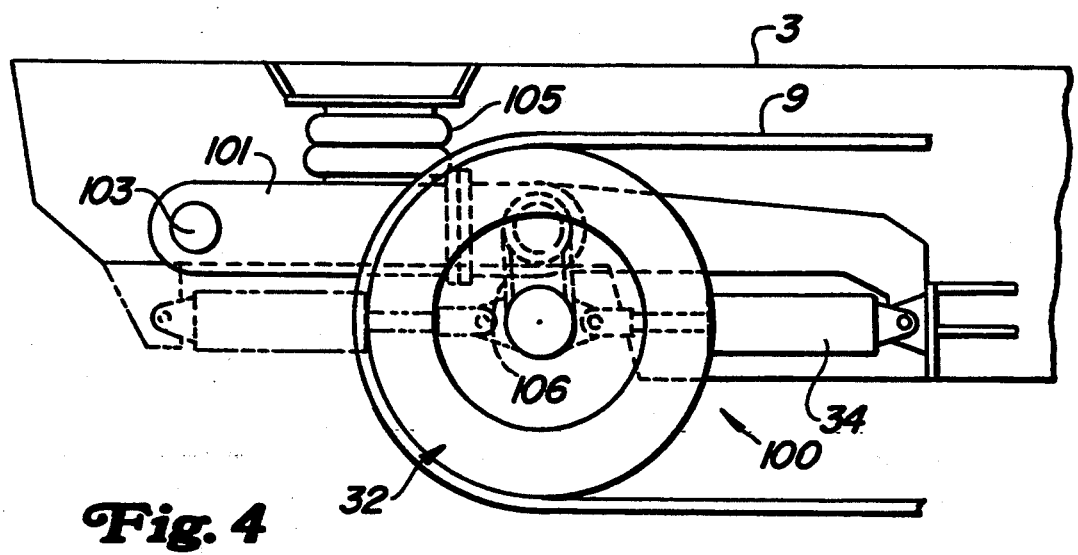
FIG. 4 is another embodiment of track assembly and adjustment device.

FIG. 4 shows a modified form of wheel carriage and adjustment device when used in conjunction with a suspension assembly according to another aspect of the present invention as described below.

FIG. 7 is a schematic side elevation of a suspension assembly according to another aspect of the present invention. The suspensions system 100 comprises a support member 101 operatively connected to the vehicle body through pivot mounting 103 at one end thereof. A spring in the form of an air spring 105 extends between support member 101 and the vehicle body 3.

The suspension system further includes a coupling member 106 in the form of a link having one end pivotally connected to the support member 101 and the other end operatively connected to the idler wheel 32 or its axle. An hydraulic cylinder 34 operatively connected between the wheel and the vehicle body is adapted to tension the belt by moving the wheel forwardly or rearwardly. In FIG. 7 the cylinder "pushes" on the wheel but as shown a phantom line could be arranged to "pull" the wheel.

Finally, it is to be understood that the inventive concept in any of its aspects can be incorporated in many different constructions so that the generality of the preceding description is not be superceded by the particularlity of the attached drawings. Various alterations, modifications an/or additions may be incorporated into the various constructions and arrangements of parts without departing from the spirit or ambit of the invention.

I claim:

1. An adjustment device for a track assembly of a track laying vehicle, the track laying vehicle comprising a vehicle body having a longitudinal axis extending between forward and rearward ends thereof and a pair of track assemblies each disposed on respective opposite sides of the vehicle body, each assembly comprising first and second wheels which are spaced apart in the direction of the longitudinal axis with at least one of the wheels defining a drive wheel, and each having a continuous belt associated with the wheels thereof, the device comprising wheel carriage means for mounting a wheel of the track assembly thereto, coupling means operatively connected to or forming part of the wheel carriage means for permitting at least limited rotational movement of the wheel about a tilt axis that is parallel to the longitudinal axis, and releasable locking means for releasably holding the wheel against the rotational movement, in a selected angular disposition relative to the tilt axis.

2. An adjustment device according to claim 1 wherein said wheel carriage means comprises a support arm for receiving the wheel which includes a wheel axle having an axis about which the wheel rotates, the wheel axle being mounted at one end of the support arm and the coupling means at or towards the other end.

3. An adjustment device according to claim 2 wherein said coupling means comprises two co-operating coupling elements one operatively connected to the wheel carriage and the other operatively connected to the vehicle body, said coupling means including a mounting arm secured to the vehicle body, the mounting arm having secured thereto one of the cooperating coupling elements.

4. An adjustment device according to claim 3 wherein said coupling elements comprise end plates or-flanges one being on the end of the support arm and the other on the end of the mounting arm, said end plates being arranged for rotation relative to one another about an axis which defines the tilt axis, and further including a guide pin which extends between the plates and about which the plates can pivot relative to one another.

5. An adjustment device according to claim 4 wherein said releasable locking means comprises a releasable fastener which includes bolt members and locking nuts associated therewith, said bolts being arranged to project from one of the plates and extend through arcuate slots in the other of the plates so as to permit limited rotation therebetween, said fastening lock nuts arranged so as to be tightened to hold the plates in a selected disposition relative to one another.

6. A suspension assembly for a track laying vehicle having a vehicle body with a first end portion and a second end portion, the assembly comprising a support member operatively connected to the vehicle body for pivotal movement about a transversely extending first pivot axis, the support member comprises an arm operatively connected to the vehicle body for pivotal movement about the first pivot axis, said the support arm being pivotally connected to the vehicle body at the first end portion; a coupling member operatively interconnecting one of the wheels of the vehicle and the support member the coupling member being pivotally mounted for pivotal movement about a second pivot axis the coupling member is operatively connected to the support member at a point spaced from the first end portion and preferably at the second end portion; and means for tensioning the belt when in the operative position on the track assembly; the arrangement being such that the pivotal movement of the support member about the first pivot axis permits up and down movement of the wheel relative to the vehicle body and the pivotal movement of the coupling member about the second pivot axis permits forward and rearward movement of the wheel relative to the vehicle body.

7. A suspension assembly according to claim 5, further including spring means between the support member and the vehicle body, the spring means being spaced in relation to the first pivot axis.

8. A suspension assembly according to claim 7 wherein said coupling member comprises a connecting link having one end portion pivotally connected to the support member and the other end portion operatively connected to the vehicle wheel.

9. A suspension assembly according to claim 8 wherein said tensioning means comprises a piston/cylinder assembly operatively interconnecting the wheel with the vehicle body.

* * * * *